United States Patent
Boles et al.

(10) Patent No.: US 7,928,866 B2
(45) Date of Patent: Apr. 19, 2011

(54) APPARATUS FOR ENHANCING PACKET COMMUNICATION

(75) Inventors: Glenn M. Boles, Fords, NJ (US); Ilija Hadzic, Millington, NJ (US); Edward Stanley Szurkowski, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/537,950

(22) Filed: Aug. 7, 2009

(65) Prior Publication Data

US 2009/0295606 A1 Dec. 3, 2009

Related U.S. Application Data

(63) Continuation of application No. 10/663,964, filed on Sep. 16, 2003, now abandoned.

(51) Int. Cl.
*H03M 7/00* (2006.01)

(52) U.S. Cl. .............................. 341/58; 341/95

(58) Field of Classification Search ............... 341/55, 341/58, 59, 95, 102–105
See application file for complete search history.

(56) References Cited

U.S. PATENT DOCUMENTS

| | | | |
|---|---|---|---|
| 4,486,739 A | | 12/1984 | Franaszek et al. |
| 4,792,793 A | * | 12/1988 | Rawlinson et al. ........... 341/104 |
| 5,450,443 A | * | 9/1995 | Siegel et al. ................... 341/58 |
| 5,577,069 A | * | 11/1996 | Lau et al. ........................ 341/55 |
| 6,085,248 A | | 7/2000 | Sambamurthy et al. |

(Continued)

FOREIGN PATENT DOCUMENTS

GB 2366161 A 2/2002

OTHER PUBLICATIONS

Widmer, et al.; "A DC-Balanced, Partitioned-Block, 8B/10B Transmission Code;" IBM J. Res. Develop, vol. 27, No. 5, Sep. 1983, pp. 440-451.

(Continued)

*Primary Examiner* — Howard Williams
(74) *Attorney, Agent, or Firm* — Hitt Gaines, P.C.

(57) ABSTRACT

An apparatus for enhancing packet communication is disclosed. In one embodiment, the apparatus includes an encoder configured to convert input data to a binary coded base system of an augmented code employing a base of an original code used for coding the input data, wherein the augmented code employs more symbols for coding than the original code, the encoder including: (1) an adder configured to add the input data to a multiplication product to generate a base sum that is binary-coded in the augmented code, (2) a multiplier configured to multiply an accumulated value by a base of the original code to provide the multiplication product that is binary-coded in the augmented code, and (3) an accumulator configured to employ the base sum to provide an accumulated value as an output for the encoder, wherein the accumulated value is binary-coded in the augmented code to represent the input data.

20 Claims, 3 Drawing Sheets

U.S. PATENT DOCUMENTS

| | | |
|---|---|---|
| 6,741,566 B1 | 5/2004 | Furlong et al. |
| 6,778,551 B1 | 8/2004 | Oh |
| 7,218,648 B1 | 5/2007 | Jackson |
| 2001/0034729 A1 | 10/2001 | Azadet et al. |
| 2002/0061012 A1 | 5/2002 | Thi et al. |
| 2003/0137975 A1 | 7/2003 | Song et al. |
| 2003/0206559 A1 | 11/2003 | Trachewsky et al. |
| 2003/0227947 A1 | 12/2003 | Shin et al. |
| 2003/0235214 A1 | 12/2003 | Leroux et al. |
| 2004/0075594 A1* | 4/2004 | Kuo et al. .................. 341/58 |
| 2005/0030898 A1 | 2/2005 | Furlong et al. |
| 2005/0041695 A1 | 2/2005 | Bordogna et al. |
| 2005/0058150 A1 | 3/2005 | Boles et al. |

OTHER PUBLICATIONS

Smith; "Digital Transmission System;" 2nd Edition, ISBN 0-442-00917-9, pp. 272-281. copyright 1993 Van Nostrand Reihold, eighth printing Kluwer Academic 1999.

Kiwimagi; "Encoding/Decoding for Magnetic Record Storage Apparatus;" IBM Technical Disclosure Bulletin, vol. 18, No. 10, Mar. 1976, pp. 3147-3149.

* cited by examiner ern and Gigabit Ethernet (1000 Base X Ethernet) of

APPARATUS FOR ENHANCING PACKET COMMUNICATION

CROSS REFERENCE TO RELATED APPLICATION

This application is a continuation of U.S. patent application Ser. No. 10/663,964, entitled "METHOD AND APPARATUS FOR ENHANCING PACKET COMMUNICATION," filed on Sep. 16, 2003 now abandoned, by Glenn M. Boles, et al., which is currently pending. The above-listed application is commonly assigned with the present invention and is incorporated herein by reference as if reproduced herein in its entirety.

TECHNICAL FIELD

This invention relates to message transmission and in particular information transmission involving packet communication.

BACKGROUND OF THE INVENTION

This section introduces aspects that may be helpful in facilitating a better understanding of the disclosure. Accordingly, the statements of this section are to be read in this light and are not to be understood as admissions about what is in the prior art or what is not in the prior art.

There are a variety of ways for transmitting messages. (In the context of this disclosure a message is a sequence of perturbations of the communication media e.g. the light that is guided on an optical fiber, or a signal that leads to or produces such perturbations while transmission is the sending of a message, the receiving of a message, the propagating of a message on such media or a combination of some or all of these activities.) A representative form of such information transmission in common use is denominated in the art as an Ethernet. The specifics of this form of transmission, to a large extent, are defined by IEEE Standard 802.3. Presently both Fast Ethernet (100 Base X Ethernet) with a baud rate of 125 Mbauds/sec and Gigabit Ethernet (1000 Base X Ethernet) of 1.25 Gigabauds/sec are in widespread use.

For a variety of communication links including Fast Ethernet and Gigabit Ethernet, the message is generally first placed into packets, followed by encoding the packet content into words. For Fast Ethernet a 4b5b word encoding technique is used i.e. for each 4-bit combination of binary digits there is assigned a unique corresponding 5-bit word (sometimes denominated a symbol or code group). For example, the 4-bit binary value for 0 is 0000 and it has assigned a 5 bit code group of 11110. Thus for each of the 16 4-bit numbers (commonly represented in a hexadecimal system as 0 through 9 and A through F), constituting the symbol alphabet for Fast Ethernet, there is assigned one unique 5-bit code group. Six control symbols denoted as /I/, /J/, /K/, /T/, /R/, and /H/ with their corresponding 5-bit code groups are employed in transmission. As a result, there are ten possible code groups that are not employed in Fast Ethernet transmission. ($2^5$ less 16 alphabet symbols less 6 control symbols).

The information as encoded into 5-bit code groups is generally formed into packets of 12,000 bits or smaller (down to 64 message bytes for Ethernet and as low as 16 message bytes for other protocols), but the standard allows for larger packets denominated jumbo packets. Each packet begins with the control code groups corresponding to /J/ and /K/ and each packet ends with the code groups corresponding to /T/ and /R/. Thus, as shown in FIG. 1, a packet begins with a /J//K/ sequence, continues with the information expressed in the required number of bits as expressed in 5-bit code groups and ends in a /T//R/ sequence, After word encoding the packet is further bit encoded, A variety of bit encoding approaches are employed including a NRZI (Non-Return to Zero with Inversion) bit encoding for Fast Ethernet and NRZ (Non-Return to Zero) for Gigabit Ethernet (See pages 272 through 281, inclusive, of a book titled *Digital Transmission Systems*, Second Edition by David R. Smith, ISBN 0-442-00917-9 which is hereby incorporated by reference in its entirety for a description of such bit encoding procedures). The clock, (i.e. the clock employed at both the receiver and transmitter to track the time interval), frequency and possibly phase, are synchronized irrespective of bit encoding approach by monitoring transitions from one signal level to the other. In the NRZ code the transition density is achieved by the selection of a word-encoding scheme whose code groups contain sufficient number of transitions to make clock recovery possible. The NRZI code ensures that transmittal signals contain sufficient transitions to again make clock recovery possible by requiring that the codewords contain, in turn, a sufficient number of bits whose value is 1.

The ability to synchronize is quite useful but because optical receivers require AC coupling to function properly and also for improved noise immunity, it is also desirable that the DC voltage level of the signal be approximately constant and typically approximately zero. As a result, the 5-bit code groups used as control or information symbols are chosen to have, after NRZI encoding, either three 1s and two 0s or three 0s and two 1s. By this expedient the DC voltage level is approximately constant since statistically the number of 1s and 0s will also be approximately equal. Other criteria are followed to enhance system operation. For example, it is desirable that the special characters are uniquely identifiable even without establishing word alignment. An overview of primary concerns behind the code design can be found in the paper by Widmer and Franaszek, titled "A DC-Balanced, Partitioned-Block, 8b/10b Transmission Code," published in *IBM Journal of Research and Development*, Vol. 27, Number 5, September 1983, pp 440-451. Although this paper refers to the 8b10b code, the concerns and motivation outlined are valid for and applicable to all codes used in communications systems.

As with a variety of other communication approaches, the Ethernet Standard IEEE 802.3 also requires a gap between packets called the interpacket gap (IPG). Thus, in the case of Fast Ethernet, after the /T//R/ delimiter, a string of at least 22 5-bit code groups (11111) corresponding to the Idle (/I/) symbol are transmitted in an interval between packets of at least 11 bytes (or 22 symbols) and sufficient to fill such interval. (By convention, the interpacket gap is considered 12 bytes but the one byte of the /T//R/ delimiter from the previous packet is considered part of the 12 bytes). As shown in FIG. 1, the Idle code groups are present after the /T//R/ delimiter. The 802.3 Standard specifies that if there are fewer than two non-consecutive 0s within any 10 bit window, then the symbol is interpreted as an Idle symbol.

Gigabit Ethernet is encoded by a similar but somewhat more sophisticated approach. The word encoding is an 8b10b scheme. The 8b group is divided into the combination of a 5-bit and a 3-bit group for word encoding. Each 5 bit group in encoding is assigned a unique 6-bit group and each 3-bit group of the unencoded symbol is assigned a unique 4-bit group. Thus, the 8-bit group consisting of a 5-bit and a 3-bit unit is encoded into a 10-bit symbol consisting of a 6-bit and 4-bit unit. The standard classifies 10 bit symbols into K terms and D terms. This control sequence is generally encoded as a combination of a K term and D term (e.g. K28.5/Dxx.y). An example of a control sequence is an Idle sequence such as K28.5/D16.2. Bit encoding as previously discussed is done by the NRZ approach. The DC balance is again maintained by choosing the valid symbols to have parity between 0s and 1s. However, because of the increased number of possible symbols beyond that which is ultimately employed, the valid symbols are divided into two domains. In forming the packet (which has packet sizes as described for Fast Ethernet), a symbol is chosen from either the first domain or the second domain so as to maintain the desired DC balance. Additional information about the 8b10b code can be found in U.S. Pat. No. 4,486,739 (Widmer and Franaszek) which is hereby incorporated by reference in its entirety.

Again, in Gigabit Ethernet, control words are employed to indicate the start of a packet and the end of a packet. An Idle symbol designated K28.5/D16.2 is also present. As with the alphabet symbols corresponding to all combinations of 8 information bits, the control symbols are present in both symbol domains. Thus, as with many other protocols, packets formed by word encoding alphabet symbols are separated by an interpacket gap comprising Idle symbols.

Irrespective of protocol it is very often desirable to find approaches that expand the information transmission rate without causing an unacceptable change in the system. A particular case of such transmission rate expansion is the addition of a side-channel that is employable for exchanging additional information such as, but not limited to, signaling, performance and monitoring. A side-channel flows messages between communicating parties on a link. A side-channel operates independently of the flow of messages traditionally assumed to be sent on such link and used to facilitate operation of the system. An approach implementing a change that is recognizable by an improved system but that still runs (without the bit rate improvement) on existing systems is denominated a transparent improvement. Similarly an improvement that will not run on existing systems but requires modification of such systems for proper functioning is denominated non-transparent. In general, transparent improvements are preferred, as they offer interoperability with already deployed systems, but non-transparent improvements that offer desirable results are not precluded. For many applications improvements that are inserted as desired, for example, at switches are particularly advantageous. Thus for such applications a transparent and/or non-transparent improvement to bandwidth that is used as desired would be advantageous.

SUMMARY OF THE INVENTION

In one aspect, an apparatus is disclosed. In one embodiment, the apparatus includes an encoder configured to convert input data to a binary coded base system of an augmented code employing a base of an original code used for coding the input data, wherein the augmented code employs more symbols for coding than the original code, the encoder including: (1) an adder configured to add the input data to a multiplication product to generate a base sum that is binary-coded in the augmented code, (2) a multiplier configured to multiply an accumulated value by a base of the original code to provide the multiplication product that is binary-coded in the augmented code, and (3) an accumulator configured to employ the base sum to provide an accumulated value as an output for the encoder, wherein the accumulated value is binary-coded in the augmented code to represent the input data.

In another aspect, another apparatus including a transmitter is disclosed. One embodiment of this apparatus includes: (1) a transmitter configured to transmit a signal having a plurality of packets and having a buffer configured to receive a stream of input data and (2) an encoder configured to convert said input data to a binary coded base system of an augmented code employing a base of an original code used for coding said input data, wherein said augmented code employs more symbols for coding than said original code, said encoder including: (2A) an adder configured to add said input data to a multiplication product to generate a base sum that is binary-coded in said augmented code, (2B) a multiplier configured to multiply an accumulated value by a base of said original code to provide said multiplication product that is binary-coded in said augmented code and (2C) an accumulator configured to employ said base sum to provide an accumulated value as an output for said encoder, wherein said accumulated value is binary-coded in said augmented code to represent said input data.

BRIEF DESCRIPTION OF THE DRAWINGS

Reference is now made to the following descriptions of embodiments, provided as examples only, taken in conjunction with the accompanying drawings, in which.

DETAILED DESCRIPTION

Figure 1:
FIG. 1 is illustrative of Ethernet encoding.

For communication approaches employing packets and interpacket gaps between the packets, bandwidth is augmented (for example by adding a side-channel), in a manner controlled by the transmitter by modifying the Interpacket gap and/or extending the codeword set employed in packets to transmit messages. The term bandwidth in the context of this invention involving data communication designates the transfer rate in bits per unit time. The appropriate modification of the Interpacket gap results in a transparent improvement while the modification to the codeword set is non-transparent. By employing both modifications, bandwidth is continuously enhanced, i.e., enhancement as desired occurs both during the Interpacket gap and during the packet. The additional channel is employable for tasks such as sending control messages, i.e. messages involving the exchange of information about the link performance, application requirements, equipment status and the like or for other purposes such as to increase the message transfer rate.

In the modification of the Interpacket gap, a portion of the Idle symbols are replaced. For Fast Ethernet in an exemplary embodiment every other Idle symbol is either replaced with a symbol group corresponding to the 0 character (bit pattern 11110) or not replaced at all. For example, a replacement with the 0 symbol corresponds to an encoded logic 1 while no replacement corresponds to a logic 0. Alternatively replacement could correspond to an encoded logic 0 while no replacement corresponds to a logic 1. The particular approach to encoding the additional information through selective replacement is not critical. Nevertheless, in this manner, in the example given, at least eleven additional information-carrying bits are added to the Interpacket gap. Similarly, in a Gigabit Ethernet environment Idle symbols are replaced to add information. The Idle replacement is done to avoid an unacceptable detection of false activity, i.e. in the example of Fast Ethernet two non-consecutive Os are not present in any 10-bit window and the line is still considered idle from the perspective of the IEEE 802.3 standard. Thus the invention in one embodiment involves the replacement of an Idle symbol with a symbol identified by a decoder as an Idle symbol to transmit a message.

To enhance the bandwidth of the message-carrying portion of a packet symbols that are undefined (unused) by the protocol such as the Ethernet protocol but which, after bit encoding, do not compromise DC balance or other primary operating concerns are added to the coding scheme. For example, in the case of Fast Ethernet, the symbol 11001, also defined as the /S/ character by the ISO9314-1 standard, is not a used symbol, but nevertheless satisfies all the properties required by the 4b5b code. As a result, it is employable without compromising the code integrity. To expand bandwidth, such characters are added to the 16 characters presently employed. Analogous characters are also present in the unused characters in both domains of a Gigabit Ethernet. By encoding information with the presently used symbols together with presently unused symbols that do not violate primary operating concerns, bandwidth is increased in the information-carrying portion of present packets such as Ethernet packets. Thus, in packet communication employing interpacket gaps an approach has been devised that allows selective bandwidth improvement by modification of the Interpacket gap, the packet information, or a combination of both.

In packet communication, packets are propagated from a sender that has encoded the information often through a plurality of switches and over transmission media to a receiver that receives the packet. On each link connecting a switch or sender or receiver, the physical layer (the level including word and bit encoding, such level in Ethernet defined by the well-known ISO Open System Interconnection Model) information is decoded and the packet is extracted. The switch processes the packet and transmits it on a different link, presumably closer to the final receiver. During this process, the packet is decoded and re-encoded at the physical layer. It is possible with the present invention to include in a packet, at switches, for example, additional information of relevance, for example, to one link in the system, but beyond that presently carried by such a packet. In one embodiment of the invention control information constitutes the additional information that is added to the packet. Control information includes for example link status and performance information, equipment status, application requirements, and statistics. Other information such as circuit-switched voice channel or additional low-bandwidth, but high-priority, data channel is also advantageously added at the desire of the sender of such additional information. However, although specific types of messages have been suggested, the invention is not so limited and is employable in essence to piggy back added messages onto a packet relative to that presently transferred in, for example, an Ethernet packet.

It is possible to add such information by an expedient involving the Interpacket gap, a second expedient involving the information-carrying portion of the packet (i.e. the part of the packet between the start of packet delimiter and the end of packet delimiter) or by a combination of both expedients. The use of both expedients allows transmission of the added information essentially continuously by employing the information portion of the packet and the Interpacket gap. Further, the use of either or both expedients is possible for all forms of packet transmissions including Fast Ethernet and Gigabit Ethernet that includes an interpacket gap. In such interpacket gap, the Idle symbol is replaced at least in part by symbols that are decoded as an Idle symbol. It is expected that it will be preferred to include information in already formed packets. Nevertheless, it is within the invention to initially form packets (before any transmission) employing the inventive expedient(s) rather than modifying a packet that has undergone some transmission. For pedagogic reason the invention is described in terms of two Ethernet embodiments.

Figure 2:
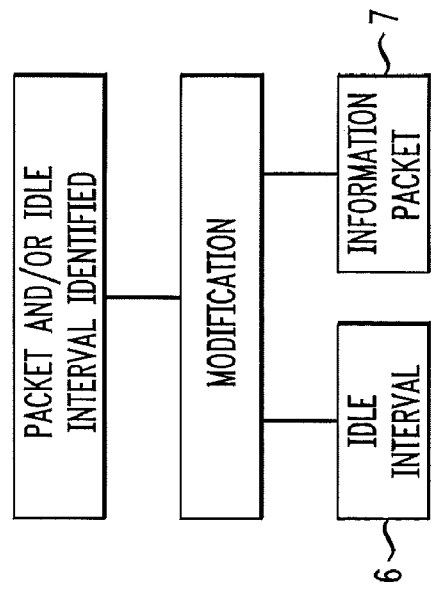
FIG. 2 is a flow diagram related to embodiments of the invention.
Figure 3:
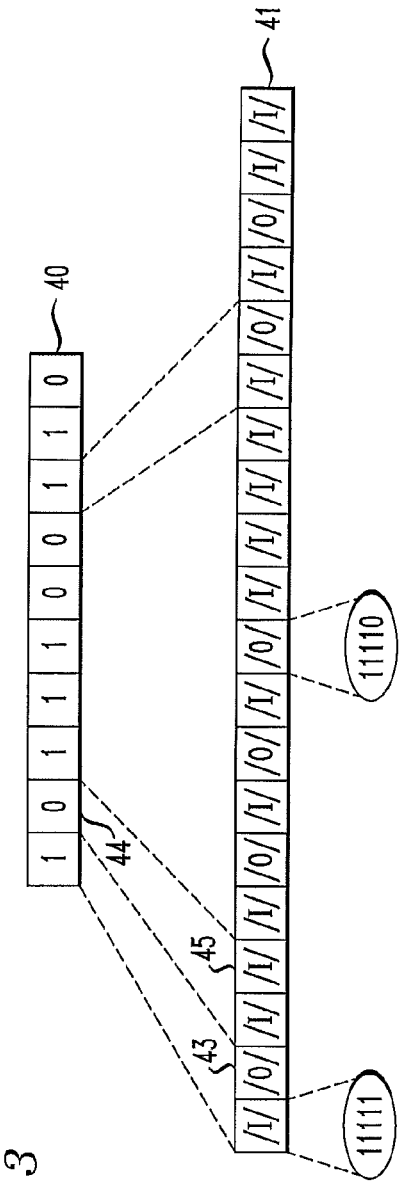
FIG. 3 is illustrative of one embodiment of the invention relating to the Interpacket gap.

In one embodiment of the invention a process is followed as shown schematically in FIG. 2. As shown, a packet and/or Interpacket gap is identified for modification. Either the packet, the Interpacket gap, or both are modified with additional information. In the case of Interpacket gap modification, 6 in FIG. 2, a portion of the Idle control symbols are replaced producing a fully transparent modification. For example, every other Idle symbol such as bit pattern 11111 for Fast Ethernet are employed to convey additional information. These symbols are, for example, replaced with the 0 symbol (bit pattern 11110) when encoding a logic 1 while no replacement is done when encoding a logic 0. As shown in FIG. 3, the information string illustrated at 40 is encoded in this manner in the Interpacket gaps indicated at 41. The first character to be encoded (a logic 1) is encoded by changing the Idle control symbol at 43 to a logic 0. Similarly, the next bit, a logic 0 at 44 is encoded by leaving unchanged the Idle symbol at 45. This process is continued through the Interpacket gaps until the message, 40, is encoded into the interval 41. Since a false activity detection occurs only when there are two non-consecutive zeros within a 10-bit window, only Idle is detected by conventional equipment. That is, since each symbol for a logic 0 is 11110, only one 0 is added for those five bits. Since the preceding and succeeding symbol is the control group 11111 for the Idle symbol, two non-consecutive Os in a 10-bit window does not, as discussed, occur.

The symbol that substitutes the /I/ character in encoding a logic 1 need not necessarily be a /0/symbol. In fact, any symbol that contains only one zero is advantageously used for substitution. For example, in Fast Ethernet the symbols along with the symbol for 0 that contain only one 0 in their code group include 7, B, D, and F that are represented by the code groups respectively 01111, 10111, 11011, and 11101. Thus use of only 7 or B or D or F to replace Idle symbols is also acceptable. Use of a combination of these symbols during a single interpacket gap creates the possibility of encountering two non-consecutive 0s in a 10 bit window with some combinations. Furthermore, for the reasons described in the next paragraph using all combinations in a single interpacket gap generally increases difficulties in recovering word alignment. Thus, although not precluded, substitution by more than one type of symbol (for example both B and D in one interpacket gap) presents additional problems and is not generally advantageous.

Typically, the standard Ethernet receiver does not maintain codeword alignment during the Idle period. In contrast, since information is being conveyed during the Idle period by practicing one aspect of the invention, it is preferable to maintain such alignment. This maintenance is generally possible for short Interpacket gaps where the receiver simply assumes that the next group of five incoming bits corresponds to the next 4b5b codeword. However, if the Interpacket gap is long, i.e., no packets transmitted for a long time, loss of alignment by the receiver is possible. A straightforward example of lost alignment is the case where the link has been established or re-established after a temporary interruption, with no packets exchanged yet. In this case the words are certainly not aligned. In another example when a single bit is lost due to transitioning from one clock domain to the other inside the receiver circuit, the word alignment is lost. However, since the Interpacket gap includes a string of nine ones and one zero, and by convention the receiver knows which symbol is being used to perform the Idle symbol substitution, the alignment is easily re-established after one 10-bit window. Reliability is improved and false re-alignments avoided during the interpacket gap if the receiver seeks for several occurrences of strings consisting of nine ones followed by one zero placed at consistent locations relative to each other, e.g., spacing between two zeros being an integer multiple of number 10, before declaring the alignment condition. In practice, the available bandwidth increase depends on the packet arrival rate and the packet length. If the link is completely loaded with 12000 bit packets, an Interpacket gap occurs every 120 microseconds with a minimum 22 Idle symbol Interpacket gap. Thus in such case, the Interpacket gap is able to carry 11 bits of additional information or approximately 90 kilobits per second. Additionally, clock differences tend to render bits encoded immediately next to packet boundaries more susceptible to erasure. To mitigate this problem, it is possible to avoid using these few symbols to the extent that a problem exists.

Similarly, in the Gigabit Ethernet the Idle symbol is an ordered set represented in accordance with the Standard by K28.5/D16.2 or K28.5/D5.6. During the Interpacket gap the system in accordance with the Standard maintains the word alignment and looks for a comma sequence (either 1100000 or 0011111) within the K28.5 character as an indicium of an Interpacket gap. The D16.2 and D5.6 part of the ordered set are used either to maintain or correct DC parity. It is thus possible to replace D16.2 or D5.6 with further information. It is, however, desirable, but not essential to not substitute for the D5.6 or D16.2 in the last Idle symbol in an Interpacket gap so that the D16.2 or D5.6 is still employable to maintain DC balance. Alternatively, it is also possible to use K28.1 instead of K28.5 during the interpacket gap. The symbol K28.1 also contains a comma sequence whose presence, as with K28.5, is used to maintain the word alignment. The presence of K28.1, a symbol that is not conventionally used, is employable to signal that the following (second) codeword is part of the message.

In implementing the replacement of Idle characters it is possible to use readily available integrated circuits to perform standard functions including driving and scanning of the optical signal, serialization and deserialization, as well as clock recovery. Generally such integrated circuits have functionality that is inconsistent with the modification required to implement embodiments of the invention. Therefore it is acceptable to disable such functionalities. The remaining operations such as word realignment, interfacing, and operations required for Idle symbol replacement in accordance with the invention are advantageously accomplished using, for example, a field programmable gate array (FPGA). The programming of an FPGA is conventional and will not be described. The functions to be performed by the FPGA, in one advantageous embodiment, are shown schematically in FIG. 5 for a suitable transmitter and in FIG. 6 for a suitable receiver.

Figure 5:
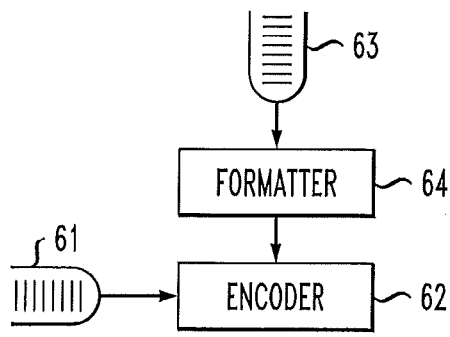
FIG. 5 involves implementation of embodiments of the invention.

As shown in FIG. 5, the packet stream together with the interpacket gaps are received at 61, decoded and the decoded binary bits are fed into encoder 62. Similarly, the binary message to be added to the interpacket gaps received at 61 are fed into input buffer 63 (typically in groups of 8 bits) which in turn feeds in a first-in-first-out sequence such bits into formatter 64. The function of formatter 64 is to provide an expedient for establishing the word alignment and boundaries between messages fed from 63 and transported over, for example, the side-channel, in accordance with the present invention. A suitable mechanism for implementing such delineation and alignment is the same as employed in HDLC formatting (a description of HDLC formatting can be found in ISO/IEC standard number 13239:2002(E) which is hereby incorporated by reference in its entirety). The HDLC specification is much broader than the message formatting aspect described herein. For different embodiments of the invention, it is possible to implement a full or partial subset of HDLC protocol as part of the block 64 shown in FIG. 5 or to implement a protocol different than HDLC that still achieves message delineation and word alignment.

For HDLC implementation, the flag insertion and data transparency with regard to the flag sequence aspects of the HDLC specification should be employed. In particular the sequence of bits 01111110, also known as the flag sequence, is inserted between messages, i.e., when the buffer labeled 63 in FIG. 5 has no message stored in it. The HDLC flag is repeatedly transmitted until a bit sequence is fed into 63. The first bit fed into 63 is then inserted after the last flag and bits continue to be inserted in sequence until bits are no longer being fed into buffer 63, and buffer 63 is empty. When buffer 63 is empty, the flag sequence is again repeatedly transmitted to encoder 62.

It is, however, possible that a string of bits from buffer 63 could have a portion that is identical to the HDLC flag. Thus formatter 64 adds a 0 logic bit after any string of five consecutive 1s received from buffer 63 before transmission to encoder 62. By the addition of this additional logic 0 the message stream is prevented from appearing to be a flag. Using this technique the data transparency with respect to the flag sequence is achieved. In decoding any logic 0 following five 1s removed to return the message stream to its original condition. The encoder 62 takes the bit stream from formatter 64 and encodes such bit stream in the interpacket gaps received from buffer 61 by, for example, as previously discussed, replacing Idle symbols to transmit a 1 and leaving Idle symbols without replacement for transmitting a 0.

Figure 6:
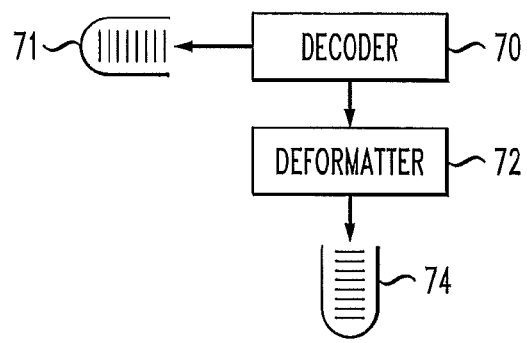
FIGS. 6 and 7 represent implementations of the invention.

FIG. 6 shows the modification for addition to a receiver to decode the bit stream from a transmitter modified as shown in FIG. 5. The transmitted bit stream is received in decoder 70. Prior to entering the decoder 70, the word realignment is established either 1) by using the codewords designed for word alignment (/J/ /K/ sequence in the Fast Ethernet case or comma sequence in the gigabit Ethernet case) in accordance with the IEEE802.3 standard or 2) by searching for the consistent appearance of logic zeros during the interpacket gap (Fast Ethernet only) in accordance with the present invention, or by both.

In one embodiment, the decoder 70 switches between two major states. (In implementation sometimes more states are convenient or the partitioning of the two states into multiple sub-states is sometimes convenient). In the first state, denominated a gap state, bits stored in the interpacket gap are extracted and are passed on to the deformatter 72. The decoder also searches for the start-of-packet sequence (e.g., /J/ /K/ in Fast Ethernet and K27.7 /S/ in Gigabit Ethernet) and switches to the second state upon encountering it. In the second state, denominated packet state, the decoder recovers the Ethernet packet in accordance with the IEEE802.3 standard and writes it into the buffer 71. Processing steps beyond the link that connects buffer 71 and 70 represent conventional Ethernet processing technology. In the packet state, the decoder also searches for the end-of-packet sequence (/T/ /R/ in Fast Ethernet or K29.7 /T/, K23.7 /R/ in Gigabit Ethernet) and switches back to the first state upon encountering it.

The message, such as in a side-channel, having been sent to deformatter 72 is, then processed. As discussed, any 0s previously added to avoid false flags are removed. Deformatter 72 also removes the HDLC flags previously added in formatter 64. The message bit stream, such as that of a side-channel, is then sent to buffer 74. Typical processing procedures such as clock synchronization and data stream alignment are done by conventional techniques. In one advantageous method for alignment the beginning of the data stream to be sent to deformatter 72 is recognized by identifying 0s that occur after a long string of 1s. Such a configuration is present at the beginning of the added message to be sent to deformatter 72 due to the sequence present from transmission of consecutive flag sequences in HDLC.

The message content of the packet, as previously discussed, is also modifiable by employing in addition to the used symbols (16 symbols in Fast Ethernet and a corresponding number in Gigabit Ethernet as enumerated in table 36-1A of the IEEE802.3 standard) further symbols classified as unused (denominated in the context of the invention nonstandard) by the Standard. For example in the case of Fast Ethernet, the symbol 11001 sometimes denominated the /S/ symbol is employable. Such symbols are advantageously chosen so that they do not disrupt primary operating concerns. Similar symbols in the Gigabit Ethernet approach include, for example, K28.0, K28.2, K28.3, K28.4, and K28.6. Thus the modification step in FIG. 2 in the expedient of modifying the information packet 7 is accomplished by augmenting the symbol alphabet being employed. In the example given for Fast Ethernet, the 16 symbol alphabet is implemented by adding an /S/ symbol to yield a 17 symbol alphabet. Similarly, in Gigabit Ethernet, it is possible to augment the symbol alphabet by adding symbols such as K28.0, K28.2, K28.3, K28.4, and K28.6.

In the example of Fast Ethernet transmission augmented with the /S/ symbol (resulting in a 17-symbol alphabet), the symbols are still five bits long, but the encoding is done in blocks larger than a single nibble. (A nibble is four bits of information before word encoding). Instead of performing a 1-to-1 mapping between a 4-bit information bit and a 5-bit codeword (standard Ethernet), the information bits are grouped in blocks of 49 bits. A block formed in this way is encoded using 12 symbols (of five bits each) from a 17 symbol alphabet. If the standard Ethernet encoding is viewed this way, it would essentially look like encoding 48-bit blocks into 60 bits. In contrast in the S-character augmented code, 49-bit blocks are encoded into blocks of 60-bits. For such an implementation, the resulting transmission bit rate is 102.083 Mbit/sec as compared to 100 Mb/s for a 16 symbol alphabet. In one embodiment of the invention, 48 bits of the block represent the packet bits, while the 49$^{th}$ bit represents the bit belonging to the additional message, providing the approximately 2 MBit/s bandwidth for the additional message. Although longer blocks are employable, the increase in bit rate generally does not justify increased decoder and encoder complexity. Analogously, for a 261 symbol alphabet (as compared to the standard 256 symbol alphabet employed in Gigabit Ethernet) an achievable bit rate is 1003.4 Mb/s as compared to 1000 Mb/s for standard Gigabit Ethernet.

Theoretically, the highest achievable bandwidth, W, that results from augmenting the alphabet of $C_o$ symbols with $C_a$ symbols is calculated as:

$$W = S \times log_2 \frac{C_o + C_a}{C_o}$$

Where S is the symbol rate, that is the rate at which the symbols are transmitted over the communication media (25 Msymbols/s for Fast Ethernet or 125 Msymbols/s for Gigabit Ethernet). Reaching the theoretical limit requires encoding fractional bits—a procedure that is not achievable. Grouping the information bits in larger blocks is a way to approach such theoretical limit without the need to encode fractional bits. In general, as previously indicated, the shortest block is advantageously used. The length L of such a block is determined according to the following formula:

$$L = \lfloor N \times log_2(C_a + C_o) \rfloor$$

Where N is the minimum natural number for which the following inequality is satisfied:

$$L > log_2 C_o$$

As previously defined, $C_o$ is the number of used message symbols before enhancement (e.g. 16 in Fast Ethernet) and $C_a$ is the number of symbols added in the enhancement. The operator $\lfloor * \rfloor$ denotes the floor operation (largest smaller integer).

Figure 4:
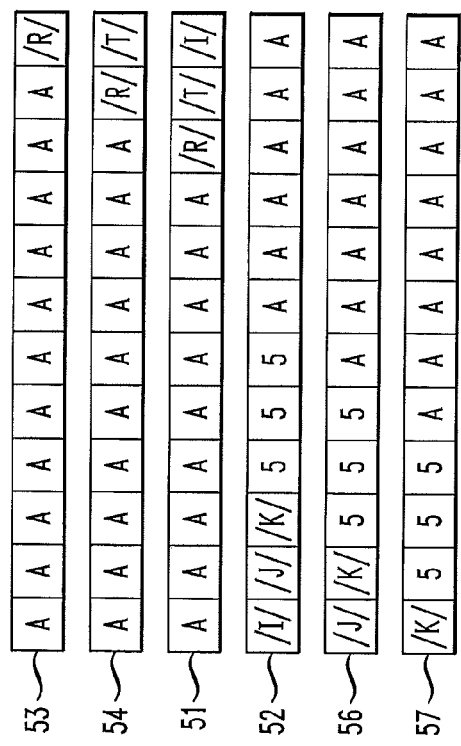
FIG. 4 relates to issues involving end-of-packet concerns.

In implementing the augmented alphabet, care should be taken relative to the start of packet and end of packet delimiters. As the data stream is divided (in the case of Fast Ethernet) into 12 nibble blocks (a nibble is four bits of information before word encoding) the last block of the packet may contain such delimiters. For example, as shown in FIG. 4, cases of block division where the delimiters are within the last block are shown where /A/ represents an alphabet symbol, /R/ and /T/ are end of packet delimiters, /J/ and /K/ are start of packet delimiters, /I/ is an Idle symbol and three consecutive /5/s are used to precede packet messages. Since the message symbols of such blocks occupy less than 12 symbols, encoding using an augmented alphabet, e.g. 17 alphabet symbols is not possible. Similarly, as shown in cases denominated 51 and 52 in FIG. 4, less than two Idle symbols are present and therefore encoding by replacing Idle symbols is also not possible since at least one Idle symbol after replacement should be present so that the decoder recognizes an Interpacket gap. When cases such as shown at 51 and 52 occur, the transmitter does not perform any encoding on the 12 symbol block, but instead uses standard Ethernet encoding. Thus additional information is not added and the bit that would have been placed in the block experiences an erasure type of error. At the receiver the recognition of a block having such erasure error causes the insertion of a dummy bit, consistently 0 or consistently 1. The correction of this dummy bit is accomplished on the higher layer using forward error correction techniques such as described in *Error Control coding: Fundamentals and Applications*, by Lin and Costello, Prentice Hall, 1983, ISBN 0-13-283796-X, which is hereby incorporated by reference in its entirety. Cases 53, 54, 56, and 57 in FIG. 4 also cause erasure errors since no Idle characters are present and a start of packet or end of packet delimiter is present. Analogous issues are present for blocks in a Gigabit Ethernet environment that contain start of packet or end of packet delimiters.

The conversion from a standard 16 symbol alphabet to an augmented alphabet is possible by building a combinatorial circuit or by constructing a look-up table. However, these two approaches are relatively inefficient. The encoding process, in essence, is a conversion from one number system to another. The input to the encoder in such conversion is a number whose base is $2^r$ where r is the number of bits in each symbol before encoding and the output is a binary coded base $C_o + C_s$ system where $C_o + C_s$ is the number of symbols in the augmented alphabet. (For Fast Ethernet and the addition of the S symbol, $2^r$ is 16 and $C_o + C_s$ is 17). An entire block, in essence, after such conversion, is a number using digits in binary code analogous to the well-known binary coded decimal representation except there is binary encoding of a base $C_o+C_s$ system instead of a decimal system.

Figure 7:
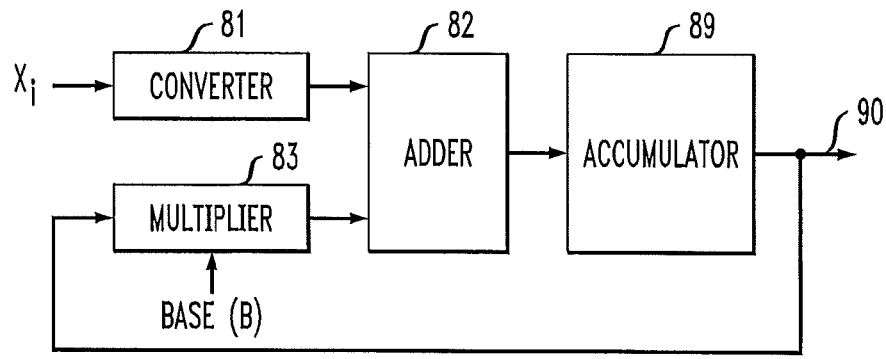

To convert from the input data to the binary coded base $C_o+C_s$ system, a circuit such as shown in FIG. 7 is useful. The bit stream to be encoded in the enhanced alphabet is fed (most significant digit first) into single digit converter, 81, with the accumulator, 89, initialized at 0. The converter sends the digit to adder 82. The number present in accumulator 89 is sent to multiplier 83 and multiplied by the base B ($2^r$ if the initial alphabet is being converted into the augmented alphabet). For the first sequence where the most significant digit has been fed to converter 81, the accumulator has 0 and thus the multiplier multiplies 0 times the base and feeds 0 into the adder 82. The adder 82 after adding the input from 81 and 83 sends the sum to accumulator 89. For the first cycle, the accumulator substitutes the input from 82, (i.e., the most significant digit, $X_{n-1}$,) for 0 and thus the accumulator will have the most significant digit present. The most significant digit now present in accumulator 89 is sent to multiplier 83 and multiplied by the base yielding $X_{n-1}B$. The second most significant digit, $X_{n-2}$, inserted into converter 81 and added to the multiplication product in 83 giving $X_{n-1}B+X_{n-2}$. The sum in adder 82 is then inserted into the accumulator and thus the accumulator 89 will then contain $X_{n-1}B+X_{n-2}$. The next most significant digit is inserted into converter 81 and the accumulator number in 89, i.e., $X_{n-1}B+X_{n-2}$ is multiplied by B in multiplier 83 to yield $X_{n-1}B^2+X_{n-2}B$. The process is continued until the least significant digit is inserted in converter 81 and processed through to accumulator 89. The result of the iterative process is output at 90 as $X_{n-1}B^{n-1}+X_{n-2}B^{n-2}+X_o$ where $X_{n-1}$ is the most significant digit and $X_o$ is the least significant digit. It should be noted that the adder and the multiplier operate in binary-coded-base-B arithmetic. Its input connected to the converter 81 represents a single binary-coded-base-B digit, while its other input represents n digits of a number in binary-coded-base-B system. Its output feeding the accumulator is also an n-digit representation of binary-coded-base-B sum of its input. The converter 81 and multiplier 83 are conveniently implemented as a small combinatorial network or as a lookup table. The adder is implementable using well-known conventional logic design practices analogous to those used for implementing binary-coded-decimal arithmetic circuits. The accumulator is a simple register, e.g., a collection of flip-flops.

The fewer the bits taken at a time into converter 81, the less complicated the circuitry for 81, 82, 83, and 89. However, the fewer the bits processed at one time, the more iterations required by the process. The more iterations required by the process, the higher the operating frequency required to accommodate the data transmission rate. An advantageous compromise between speed and circuit complexity involves four bits (representable as a hexadecimal number through either a look up table or four input combinatorial circuit) being taken into converter 81. The multiplier 83, adder 82, and accumulator 89 are sized correspondingly. At the receiver, the decoder of the packet containing an augmented alphabet performs an opposite operation from the encoding just described. The only difference between the encoder and the decoder is that the converter 81 now converts the binary-coded-base-B digit into a binary number (which in some embodiments of the invention is simply straight wiring). The adder and the multiplier then operate in binary arithmetic. Such encoding as shown in FIG. 7 when employed in addition to the modification of the interpacket gap or when employed without such modification is inserted into the circuit of FIG. 5 between blocks 61 and 62 and an input from the block 64 is supplied when constructing the initial data block (i.e., a 49-bit block discussed earlier). The corresponding decoder is inserted into the circuit of FIG. 6 between blocks 71 and 70 and the bit from the reconstructed block that corresponds to the side-channel after decoding is fed into block 72.

Those skilled in the art to which the application relates will appreciate that other and further additions, deletions, substitutions and modifications may be made to the described embodiments. Additional embodiments may include other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

What is claimed is:

1. An apparatus, comprising:
   an encoder configured to convert input data to a binary coded base system of an augmented code employing a base of an original code used for coding said input data, wherein said augmented code employs more symbols for coding than said original code, said encoder including:
   an adder configured to add said input data to a multiplication product to generate a base sum that is binary-coded in said augmented code;
   a multiplier configured to multiply an accumulated value by a base of said original code to provide said multiplication product that is binary-coded in said augmented code; and
   an accumulator configured to employ said base sum to provide an accumulated value as an output for said encoder, wherein said accumulated value is binary-coded in said augmented code to represent said input data.

2. The apparatus as recited in claim 1 wherein said original code is a 4b5b code that uses 16 symbols denoted 0-F and said augmented code is a 4b5b code that uses 17 symbols denoted 0-F and S.

3. The apparatus as recited in claim 1 further comprising a converter configured to receive said input data as a packet stream and provide said input data to said adder.

4. The apparatus as recited in claim 1 wherein said converter is configured to simultaneously receive four bits of said input data.

5. The apparatus as recited in claim 1 wherein said converter receives said input data in descending order from a most significant bit to a least significant bit.

6. The apparatus as recited in claim 5 wherein said accumulator initializes said accumulated value to zero when receiving said most significant bit.

7. The apparatus as recited in claim 1 wherein said accumulator is configured to iteratively replace said accumulated value with said base sum until said base sum includes a least significant bit of said input data.

8. The apparatus as recited in claim 1 wherein said converter receives said input data as a block of 49 grouped bits to be encoded by said encoder.

9. The apparatus as recited in claim 8 wherein said encoder encodes said 49 grouped bits employing 12 symbols of said augmented code.

10. The apparatus as recited in claim 9 wherein 48 bits of said 49 grouped bits are packet bits.

11. The apparatus as recited in claim 9 wherein one bit of said 49 grouped bits is employed as a control message.

12. An apparatus, comprising:
a transmitter configured to transmit a signal having a plurality of packets, said transmitter including:
  a buffer configured to receive a stream of input data; and
  an encoder configured to convert said input data to a binary coded base system of an augmented code employing a base of an original code used for coding said input data, wherein said augmented code employs more symbols for coding than said original code, said encoder including:
    an adder configured to add said input data to a multiplication product to generate a base sum that is binary-coded in said augmented code;
    a multiplier configured to multiply an accumulated value by a base of said original code to provide said multiplication product that is binary-coded in said augmented code; and
    an accumulator configured to employ said base sum to provide an accumulated value as an output for said encoder, wherein said accumulated value is binary-coded in said augmented code to represent said input data.

13. The apparatus as recited in claim 12 wherein said original code is a 4b5b code that uses 16 symbols denoted 0-F and said augmented code is a 4b5b code that uses 17 symbols denoted 0-F and S.

14. The apparatus as recited in claim 12 wherein said encoder further comprises a converter configured to receive said input data as a packet stream from said buffer and provide said input data to said adder.

15. The apparatus as recited in claim 14 wherein said converter receives said input data in descending order from a most significant bit to a least significant bit.

16. The apparatus as recited in claim 15 wherein said accumulator initializes said accumulated value to zero when receiving said most significant bit.

17. The apparatus as recited in claim 12 wherein said accumulator is configured to iteratively replace said accumulated value with said base sum until said base sum includes a least significant bit of said input data.

18. The apparatus as recited in claim 12 wherein said converter receives said input data as a block of 49 grouped bits to be encoded by said encoder.

19. The apparatus as recited in claim 18 wherein said encoder encodes said 49 grouped bits employing 12 symbols of said augmented code.

20. The apparatus as recited in claim 19 wherein 48 bits of said 49 grouped bits are packet bits and one bit of said 49 grouped bits is employed as a control message.

* * * * *